(12) United States Patent  
Zhao

(10) Patent No.: US 10,023,079 B2  
(45) Date of Patent: Jul. 17, 2018

(54) CHILD SAFETY SEAT

(71) Applicant: Wonderland Nurserygoods Company Limited, Tuen Min, N.T. (HK)

(72) Inventor: Guang-Hui Zhao, Tuen Mun (HK)

(73) Assignee: Wonderland Switzerland AG (CH)

( * ) Notice: Subject to any disclaimer, the term of this patent is extended or adjusted under 35 U.S.C. 154(b) by 0 days.

(21) Appl. No.: 15/371,526

(22) Filed: Dec. 7, 2016

(65) Prior Publication Data

US 2017/0190268 A1 Jul. 6, 2017

(30) Foreign Application Priority Data

Dec. 30, 2015 (CN) ..................... 2015 2 1141337 U

(51) Int. Cl.
  *B60N 2/26* (2006.01)
  *B60N 2/28* (2006.01)

(52) U.S. Cl.
  CPC ......... *B60N 2/2806* (2013.01); *B60N 2/2851* (2013.01)

(58) Field of Classification Search
  CPC .......................... B60N 2/2806; B60N 2/2851
  USPC ..................................................... 297/256.16
  See application file for complete search history.

(56) References Cited

U.S. PATENT DOCUMENTS

| | | | | |
|---|---|---|---|---|
| 5,567,007 A | * | 10/1996 | Czernakowski | B60N 2/2806 297/216.11 |
| 6,508,510 B2 | | 1/2003 | Yamazaki | |
| 6,672,664 B2 | * | 1/2004 | Yanaka | B60N 2/2806 297/256.16 X |
| 7,163,265 B2 | | 1/2007 | Adachi | |
| 7,901,003 B2 | | 3/2011 | Meeker et al. | |
| 7,926,874 B2 | * | 4/2011 | Hendry | B60N 2/2806 297/256.16 X |
| 8,262,161 B2 | * | 9/2012 | Fritz | B60N 2/2806 297/256.16 X |
| 8,322,788 B2 | * | 12/2012 | Williams | B60N 2/2806 297/256.16 |
| 8,690,244 B2 | | 4/2014 | Fritz et al. | |
| 8,845,022 B2 | | 9/2014 | Strong et al. | |
| 8,973,991 B2 | * | 3/2015 | Wuerstl | B60N 2/2806 297/253 |
| 8,973,992 B2 | | 3/2015 | Guo | |

(Continued)

FOREIGN PATENT DOCUMENTS

GB 947110 1/1964

*Primary Examiner* — Rodney B White

(74) *Attorney, Agent, or Firm* — Daniel A. Tallitsch; Baker McKenzie

(57) ABSTRACT

A child safety seat includes a seat portion and a backrest connected with each other, and a belt restraint and a latch respectively connected with the backrest, the belt restraint and the latch respectively having a first and a second outer major surface. The backrest has a front surface on which is provided a recess, and the belt restraint is movable relative to the backrest between a clamping state for pressing an anchoring belt in the recess and a release state for facilitating installation or removal of the anchoring belt. The latch can engage with the belt restraint for locking the belt restraint in the clamping state, and disengage from the belt restraint for its movement between the clamping state and the release state. The first and second outer major surfaces are substantially flush with the front surface of the backrest when the latch is engaged with the belt restraint.

19 Claims, 11 Drawing Sheets

(56) References Cited

U.S. PATENT DOCUMENTS

| | | | |
|---|---|---|---|
| 2006/0091709 A1* | 5/2006 | Emmert | B60N 2/2806 297/256.16 |
| 2010/0187880 A1* | 7/2010 | Heisey | B60N 2/2806 297/256.16 |
| 2014/0265489 A1* | 9/2014 | Morgenstern | B60N 2/2812 297/256.15 |

* cited by examiner

CHILD SAFETY SEAT

CROSS-REFERENCE TO RELATED APPLICATION(S)

This application claims priority to China Patent Application No. 201521141337.0 filed on Dec. 30, 2015.

BACKGROUND

1. Field of the Invention

The present invention relates to child safety seats.

2. Description of the Related Art

A child safety seat is typically used in an automobile vehicle to properly restrain a child in the event of accidental collision. The installation of the child safety seat usually requires securely attaching the child safety seat on the vehicle seat with a vehicle seatbelt or a harness separately provided. This may be difficult to achieve with certain child safety seats, which may require that a caregiver climbs into the vehicle and press down on the child safety seat while pulling on the vehicle seatbelt so that it is properly tensioned.

Therefore, there is a need for an improved child safety seat that allows convenient attachment on a vehicle seat with minimal effort, and can address at least the foregoing issues.

SUMMARY

The present application describes a child safety seat having a belt tensioning mechanism that is operable to press and clamp an anchoring belt for secure attachment of the child safety seat on a vehicle seat. In some embodiment, the child safety seat includes a seat portion and a backrest connected with each other, and a belt restraint and a latch respectively connected with the backrest, the belt restraint and the latch respectively having a first and a second outer major surface. The backrest has a front surface on which is provided a recess, and the belt restraint is movable relative to the backrest between a clamping state for pressing an anchoring belt in the recess and a release state for facilitating installation or removal of the anchoring belt. The latch is operable to engage with the belt restraint for locking the belt restraint in the clamping state, and to disengage from the belt restraint for movement of the belt restraint between the clamping state and the release state. The first and second outer major surfaces are substantially flush with the front surface of the backrest when the latch and the belt restraint are engaged with each other.

In some other embodiments, the child safety seat includes a seat portion and a backrest connected with each other, the backrest having a front surface on which is provided a recess, and a belt restraint and a latch respectively connected pivotally with the backrest at an upper and a lower side of the recess. The belt restraint is rotatable relative to the backrest between a clamping state for pressing an anchoring belt in the recess and a release state for facilitating installation or removal of the anchoring belt, and the latch is operable to engage with the belt restraint for locking the belt restraint in the clamping state, and to disengage from the belt restraint for unlocking the belt restraint and allowing movement thereof between the clamping state and the release state. The belt restraint protrudes from the front surface of the backrest in the release state, and the latch is rotatable to protrude from the front surface of the backrest for disengaging from the belt restraint.

DETAILED DESCRIPTION OF THE EMBODIMENTS

Figure 1:
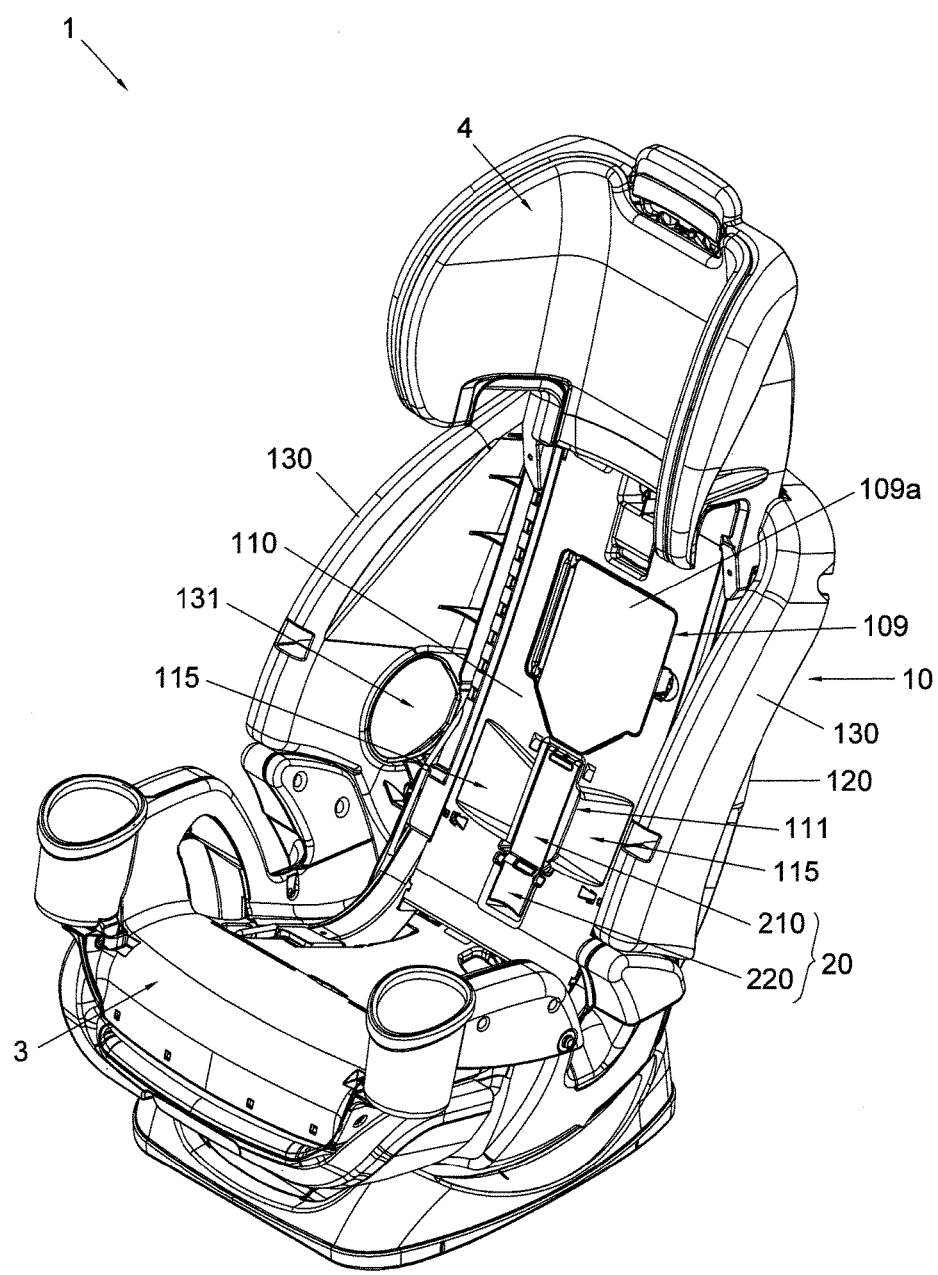
FIG. 1 is a perspective view illustrating an embodiment of a child safety seat.

FIG. 1 is a schematic view illustrating an embodiment of a child safety seat 1. Referring to FIG. 1, the child safety seat 1 can include a seat portion 3 and a backrest 10 affixed with each other, and a headrest 4 assembled with the backrest 10 for vertical adjustment. Both the seat portion 3 and the backrest 10 may be comprised of rigid plastics bodies. The backrest 10 can have a front surface 110 for supporting a child's back, a rear surface 120 opposite to the front surface 110, and two sidewalls 130 respectively projecting forward relative to the front surface 110 at a left and a right side thereof. The front surface 110 and the two sidewalls 130 can delimit at least partially a space for receiving a child. The two sidewalls 130 can respectively have two openings 131 horizontally aligned with each other for passage of an anchoring belt 2 (better shown in FIG. 9), which can be used for attaching the child safety seat 1 on a vehicle seat. The headrest 4 is movable along the front surface 110 of the backrest 10 for adjustment in accordance with a child' height. Moreover, the seat portion 3 and the backrest 10 may be covered at least partially with softgoods (not shown) for providing a soft and comfortable support contact.

Referring to FIG. 1, the front surface 110 of the backrest 10 can include a recess 111 and a harness storage cavity 109. The harness storage cavity 109 can be used for storage of a restraint harness (not shown) of the child safety seat 1. A cover 109a may be connected with the backrest 10 for closing and opening the harness storage cavity 109. The front surface 110 can be formed with the recess 111 defined thereon, the recess 111 being disposed at a central location on the front surface 110 adjacently below the harness storage cavity 109. The recess 111 can be placed in a region overlapping at least partially with a belt path passing through the two openings 131.

Figure 2:
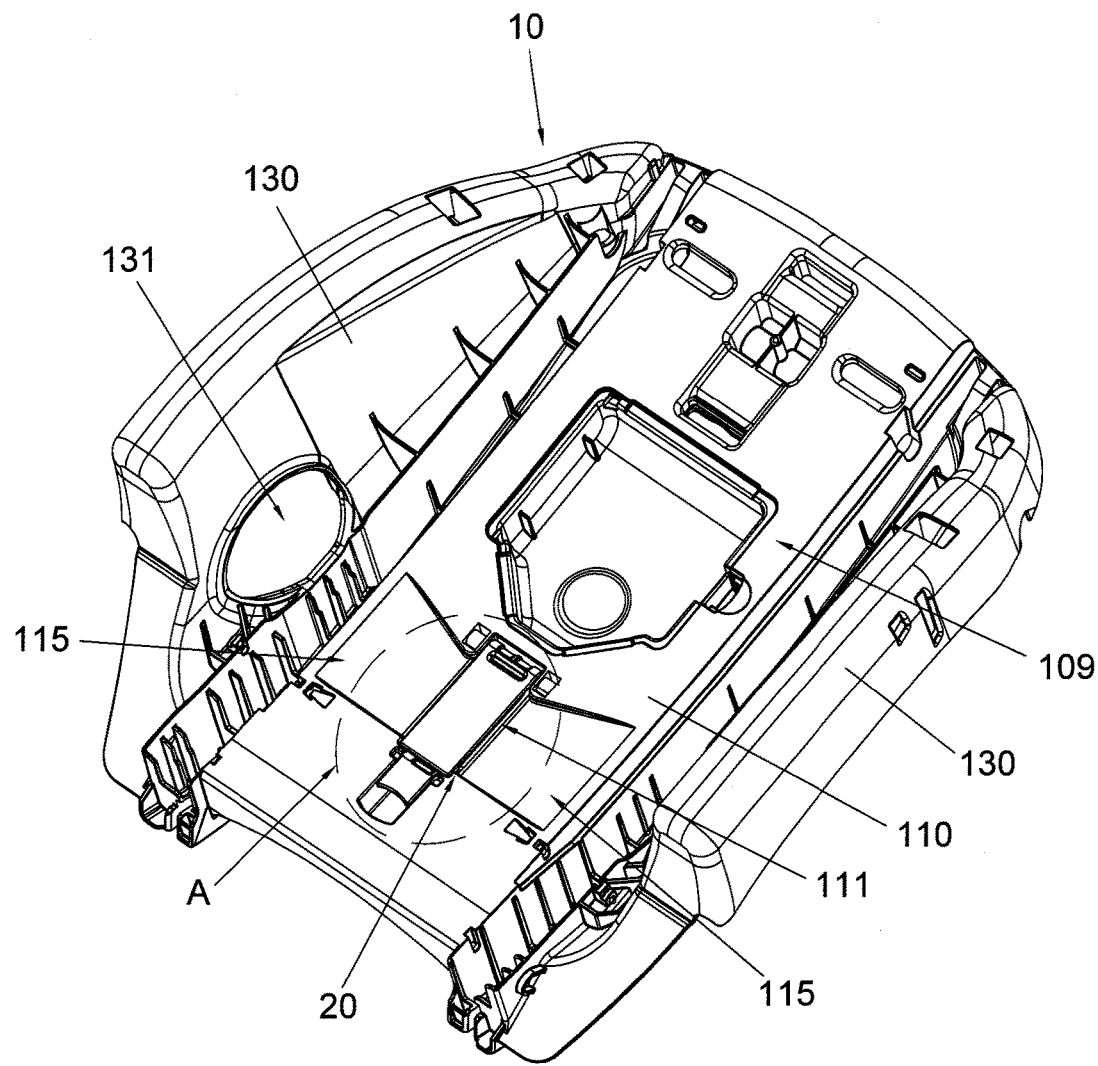
FIG. 2 is a schematic view illustrating a backrest of the child safety seat shown in FIG. 1.
Figure 3:
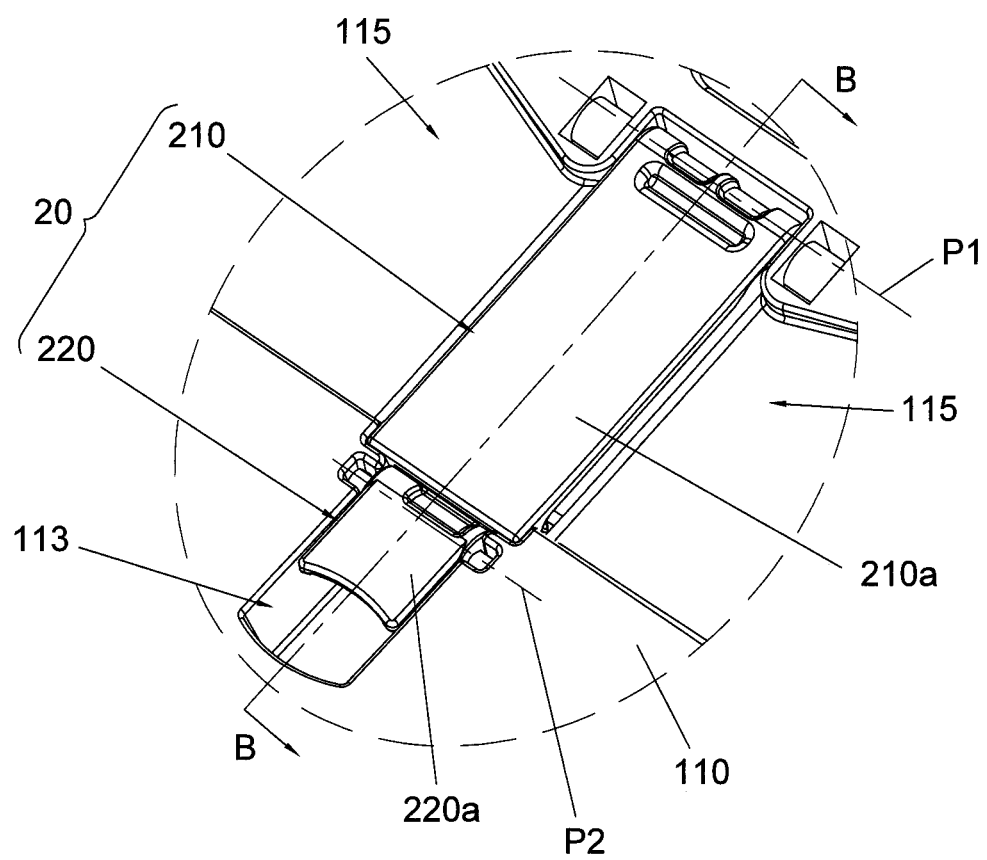
FIG. 3 is an enlarged view of portion A shown in FIG. 2.

FIG. 2 is a schematic view illustrating the backrest 10 alone, and FIG. 3 is an enlarged view of portion A shown in FIG. 2. For clarity, the representation of some elements on the backrest 10 (such as the headrest 4) is omitted in FIG. 2.

Referring to FIGS. 1-3, the child safety seat 1 can further include a belt tensioning mechanism 20 assembled with the backrest 10. The belt tensioning mechanism 20 can be disposed on the front surface 110 of the backrest 10, at a middle location between the two sidewalls 130 and near a bottom edge of the backrest 10. The region where is placed the belt tensioning mechanism 20 overlaps at least partially with the belt path passing through the two openings 131. The belt tensioning mechanism 20 can be operable to press and clamp an anchoring belt 2 (better shown in FIG. 9) passing through the two openings 131, which can provide tension in the anchoring belt 2 for secure attachment of the child safety seat 1 on a vehicle seat.

The belt tensioning mechanism 20 can be assembled with the backrest 10 adjacent to the recess 111. When the child safety seat is installed on a vehicle seat, the belt tensioning mechanism 20 can operate to press a portion of an anchoring belt into the recess 111. Moreover, the front surface 110 of the backrest 10 can include two symmetric depressions 115 respectively provided at a left and a right side of the recess 111, corresponding to the belt path passing through the two openings 131. The two depressions 115 can respectively connect with the recess 111, and can guide the passage of the anchoring belt across the front surface 110 and into the recess 111.

In conjunction with FIGS. 2 and 3, FIGS. 4-8 are various schematic views illustrating the construction of the belt tensioning mechanism 20. Referring to FIGS. 2-8, the belt tensioning mechanism 20 can include a belt restraint 210, a latch 220 and two springs 240 and 260. The belt restraint 210 can be a rigid part, and can have an outer major surface 210a and an inner major surface 210b opposite to each other. The belt restraint 210 can be pivotally connected with the backrest 10 at an upper side of the recess 111 about a pivot axis P1 that extends transversally relative to the backrest 10. For example, an end portion 211 of the belt restraint 210 can be provided with a hole 213, and a shaft portion 230 connected with two opposite sidewalls of the recess 111 can pass through the hole 213 for achieving the pivot connection of the belt restraint 210. Moreover, a free end portion 212 of the belt restraint 210 opposite to its end portion 211 can include a notch 214 and a protrusion 215. The notch 214 is formed on an end surface of the free end portion 212, and may be exemplary defined by two surfaces intersecting each other at an angle, one of the two surfaces being a ramp surface 214a. The protrusion 215 is contiguous to the end surface of the belt restraint 210 where is provided the notch 214, and can project on the side of the inner major surface 210b.

Figure 9:
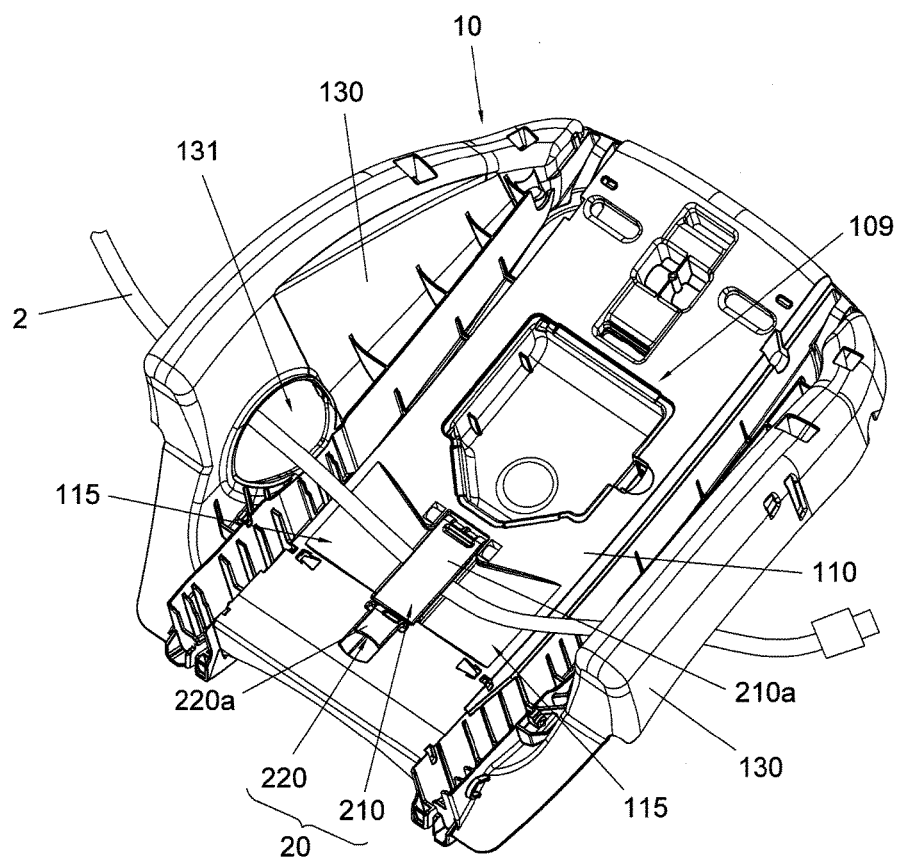
FIG. 9 is a schematic view illustrating the belt tensioning mechanism clamping an anchoring belt.

With the aforementioned assembly, the belt restraint 210 can rotate about the pivot axis P1 relative to the backrest portion 10 between a clamping state and a release state. In the clamping state, the belt restraint 210 is substantially received in the recess 111 for pressing an anchoring belt 2 (as shown in FIG. 9) in the recess 111, the outer major surface 210a of the belt restraint 210 being substantially flush with the front surface 110 of the backrest 10, and the inner major surface 210b being received inside the recess 111. The protrusion 215 may be received in a pocket 112 provided in the recess 111 in the clamping state. As better shown in FIG. 7, the inner major surface 210b of the belt restraint 210 may have a protruding rib 216, which may increase pressing contact with the anchoring belt in the clamping state.

Figure 5:
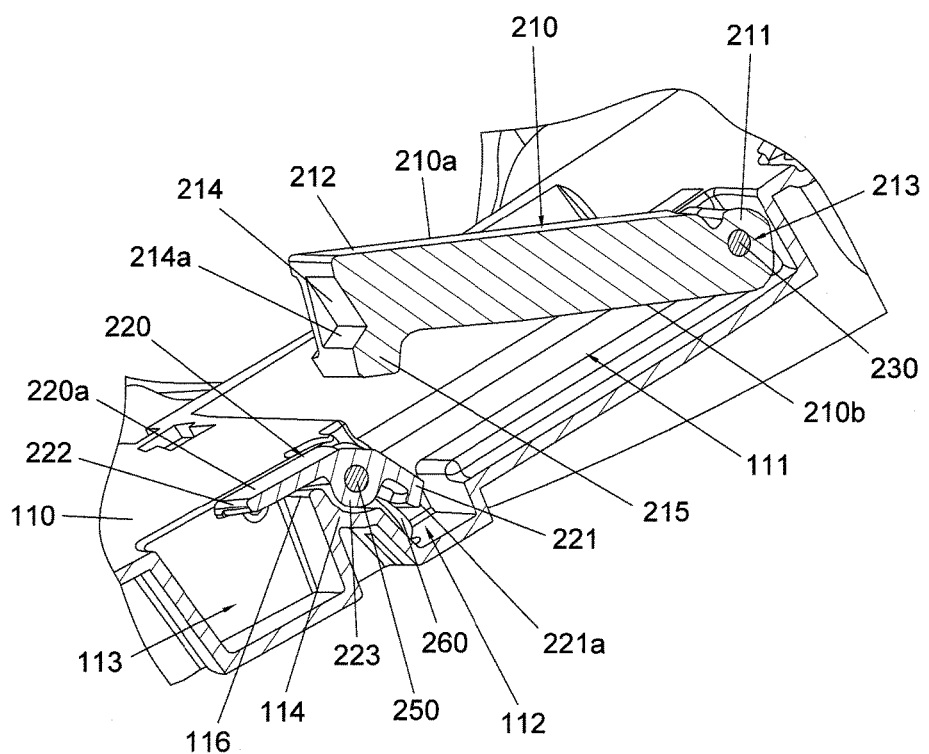
FIG. 5 is a cross-sectional view illustrating the belt tensioning mechanism in an exemplary release state.

When it is in the release state (e.g., as shown in FIG. 5), the belt restraint 210 projects forward from the front surface 110 and uncovers the recess 111 for facilitating installation or removal of the anchoring belt 2.

Figure 6:
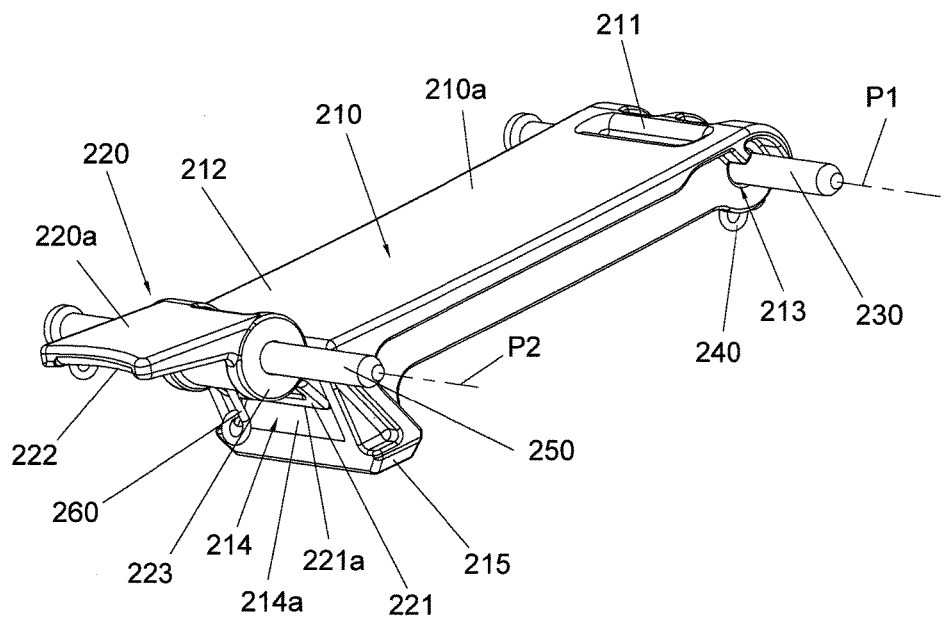
FIG. 6 is a perspective view illustrating the construction of the belt tensioning mechanism.
Figure 7:
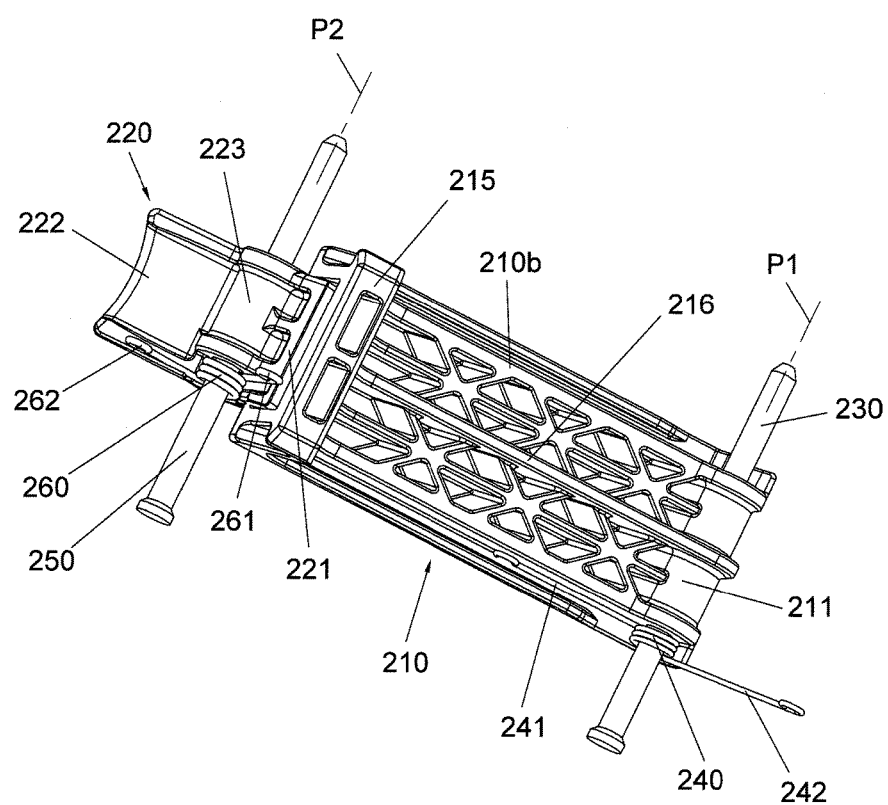
FIG. 7 is a perspective view illustrating the belt tensioning mechanism under another angle of view.
Figure 8:
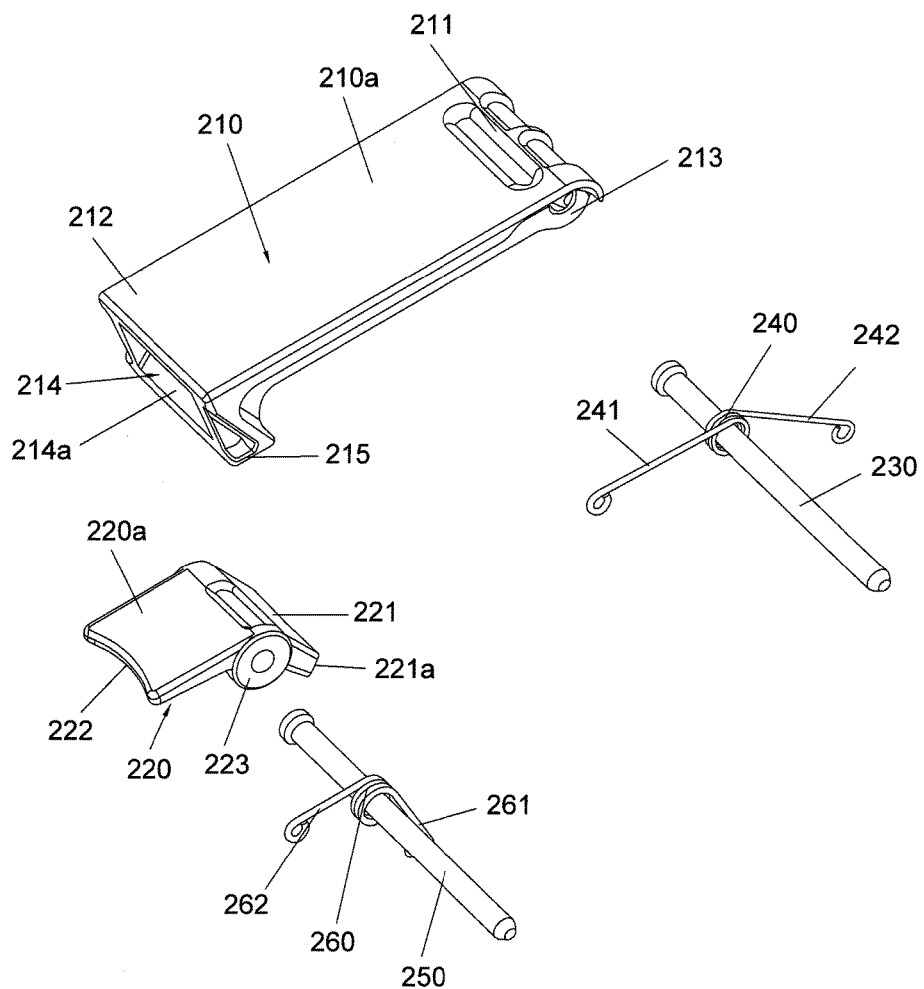
FIG. 8 is an exploded view of the belt tensioning mechanism.

Referring to FIGS. 6-8, the spring 240 can be assembled around the shaft portion 230, and can have two prongs 241 and 242 respectively connected with the belt restraint 210 and the backrest 10. The spring 240 can rotationally bias the belt restraint 210 toward the release state for facilitating installation of the anchoring belt 2.

Referring to FIGS. 2-8, the latch 220 is movable relative to the backrest 10 to engage with the free end portion 212 of the belt restraint 210 to lock the belt restraint 210 in the clamping state, and to disengage from the free end portion 212 to unlock the belt restraint 210. According to an example of construction, the latch 220 may be pivotally connected with the backrest 10 at a lower side of the recess 111 about a pivot axis P2 that extends transversally relative to the backrest 10. The pivot axis P2 is generally parallel to the pivot axis P1, and is located vertically below the pivot axis P1 and below the belt path passing through the two openings 131 and across the recess 111. The latch 220 can include an engaging portion 221, an actuating portion 222 and a mount portion 223. The latch 220, including the engaging portion 221, the actuating portion 222 and the mount portion 223, may be formed integrally as a single part. The mount portion 223 can have a hole through which a shaft portion 250 connected with the backrest 10 is assembled, thereby pivotally connecting the latch 220 with the backrest 10 about the pivot axis P2. An outer major surface 220a of the latch 220 can be defined on the actuating portion 222, which is exposed for manual operation. The engaging portion 221 can extend at an angle relative to the actuating portion 222, and can be configured to engage with the free end portion 212 for locking the belt restraint 210 in the clamping state. For example, the engaging portion 221 can extend at one side of the pivot axis P2 with a shape that can engage with the notch 214 at the free end portion 212 of the belt restraint 210.

As shown, the engaging portion 221 and the actuating portion 222 may extend at two opposite sides of the mount portion 223. It will be appreciated, however, that the engaging portion 221 and the actuating portion 222 may be disposed differently relative to the mount portion 223, e.g., they may be disposed on a same side of the mount portion 223.

Referring to FIGS. 6-8, the spring 260 can be assembled around the shaft portion 250, and can have two prongs 261 and 262 respectively connected with the latch 220 and the backrest 10. The spring 260 can rotationally bias the latch 220 toward a locking state for engaging with the belt restraint 210. The rotational displacement of the latch 220 biased by the spring 260 may be delimited by the contact of the latch 220 with a stop abutment 116 (better shown in FIGS. 4 and 5) affixed with the backrest 10.

Figure 4:
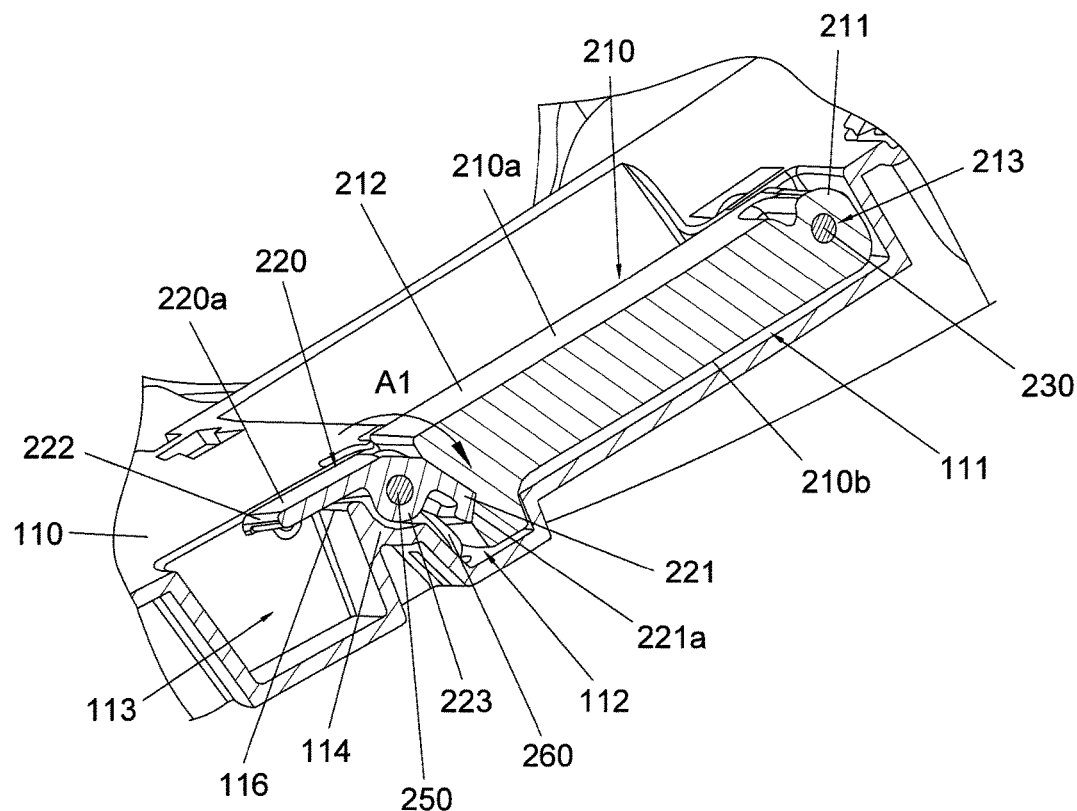
FIG. 4 is a cross-sectional view taken along section line B shown in FIG. 3 illustrating a belt tensioning mechanism provided on the backrest of the child safety seat, the belt tensioning mechanism being in a clamping state.

Referring to FIGS. 3-5, for facilitating unlocking operation of the latch 220, the front surface 110 of the backrest 10 can include a recess 113 in a region corresponding to the actuating portion 222 of the latch 220. The recess 113 can be disposed below the recess 111, and the mount portion 223 of the latch 220 can be pivotally connected with the backrest 10 adjacent to a region 114 thereof located between the two recesses 111 and 113. When the latch 220 is in the locking state, the actuating portion 222 can partially cover the recess 113. A caregiver can introduce a finger in the recess 113, and pull the actuating portion 222 away from the recess 113 for rotating the latch 220 in an unlocking direction.

Exemplary operation of the belt tensioning mechanism 20 is described hereinafter with reference to FIGS. 1-9. Suppose that the belt tensioning mechanism 20 is in the clamping state as shown in FIGS. 1-4. The belt restraint 210 is substantially received in the recess 111, and the latch 220 biased by the spring 260 can engage with the free end portion 212 of the belt restraint 210 to lock the belt restraint 210 in the clamping state. In particular, the engaging portion 221 can engage with the notch 214 at the free end portion 212 of the belt restraint 210, an edge 221*a* (better shown in FIG. 4) of the engaging portion 221 being adjacent to the ramp surface 214*a* of the notch 214. While the latch 220 engages and locks the belt restraint 210 in the clamping state, the outer major surface 210*a* of the belt restraint 210 and the outer major surface 220*a* of the latch 220 can be substantially flush with the front surface 110 of the backrest 10, and both the belt restraint 210 and the latch 220 do not protrude from the front surface 110 of the backrest 10. Accordingly, the belt tensioning mechanism 20 would not interfere with the vertical movement of the headrest 4 along the front surface 110 of the backrest 10.

For securely attaching the child safety seat 1 on a vehicle seat, a caregiver can pull the actuating portion 222, which causes the latch 220 to rotate relative to the backrest 10 in a direction A1 (e.g., clockwise direction as shown in FIG. 4) to protrude forward from the front surface 110 of the backrest 10 and disengage the engaging portion 221 from the notch 214 for unlocking the belt restraint 210. The inclination of the ramp surface 214*a* is such that it may be in sliding contact with the edge 221*a* of the engaging portion 221, which allows rotational displacement of the latch 220 relative to the belt restraint 210 for disengaging the engaging portion 221 from the free end portion 212 of the belt restraint 210. Once the latch 220 is disengaged from the belt restraint 210, the spring 240 can urge the belt restraint 210 to rotate relative to the backrest 10 to the release state for opening the recess 111. The caregiver then can release the actuating portion 222, and the spring 260 can urge the latch 220 to rotate reversely (e.g., anticlockwise direction) opposite to the direction A1 shown in FIG. 4 to its initial state. The belt restraint 210 can be maintained in the release state by the biasing force applied by the spring 240 on the belt restraint 210. As mentioned above, it will be appreciated that the engaging portion 221 and the actuating portion 222 may be disposed on a same side of the mount portion 223. In this case, a caregiver can push the actuating portion 222, which causes the latch 220 to rotate relative to the backrest 10 in an anticlockwise direction for disengaging the engaging portion 221 from the notch 214.

While the belt restraint 210 remains in the release state, the caregiver can install an anchoring belt 2 (better shown in FIG. 9) through the two openings 131 and in a space between the belt restraint 210 and the front surface 110 of the backrest 10, and fasten the two ends of the anchoring belt 2 with an anchorage provided on the vehicle seat. The belt restraint 210 then can be manually rotated about the pivot axis P1 toward the backrest 10 for pressing the anchoring belt 2 into the recess 111. As the belt restraint 210 rotates toward the recess 111, the protrusion 215 at the free end portion 212 of the belt restraint 210 can come in sliding contact with the latch 220 and push it in rotation in the direction A1 against the biasing action of the spring 260 for facilitating locking engagement of the engaging portion 221 of the latch 220 with the notch 214. Once the belt restraint 210 reaches the clamping state, the biasing action of the spring 260 can urge the latch 220 to engage with the belt restraint 210, thereby locking the belt restraint 210 in position as shown in FIG. 9. While the anchoring belt 2 is clamped by the belt restraint 210 locked in the clamping state, the outer major surface 210*a* of the belt restraint 210 and the outer major surface 220*a* of the latch 220 can be substantially flush with the front surface 110 of the backrest 10, and both the belt restraint 210 and the latch 220 do not protrude from the front surface 110 of the backrest 10.

For removing the anchoring belt 2, the latch 220 can be operated as described previously for unlocking the belt restraint 210. The unlocked belt restraint 210 then can be rotated away from the recess 111 to release the anchoring belt 2.

Figure 10:
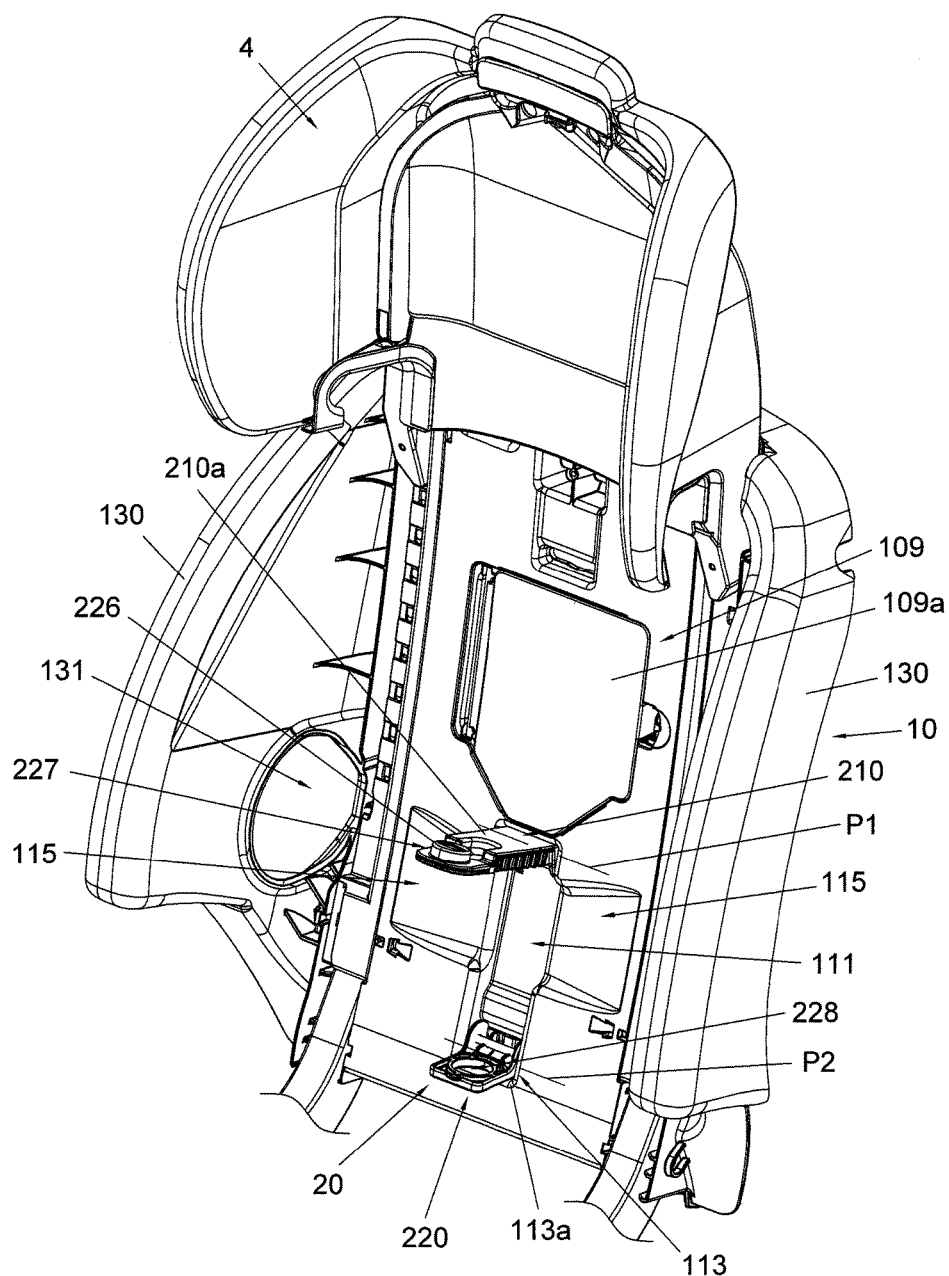
FIG. 10 is a perspective view illustrating a variant construction of the belt tensioning mechanism provided on the backrest of the child safety seat.
Figure 11:
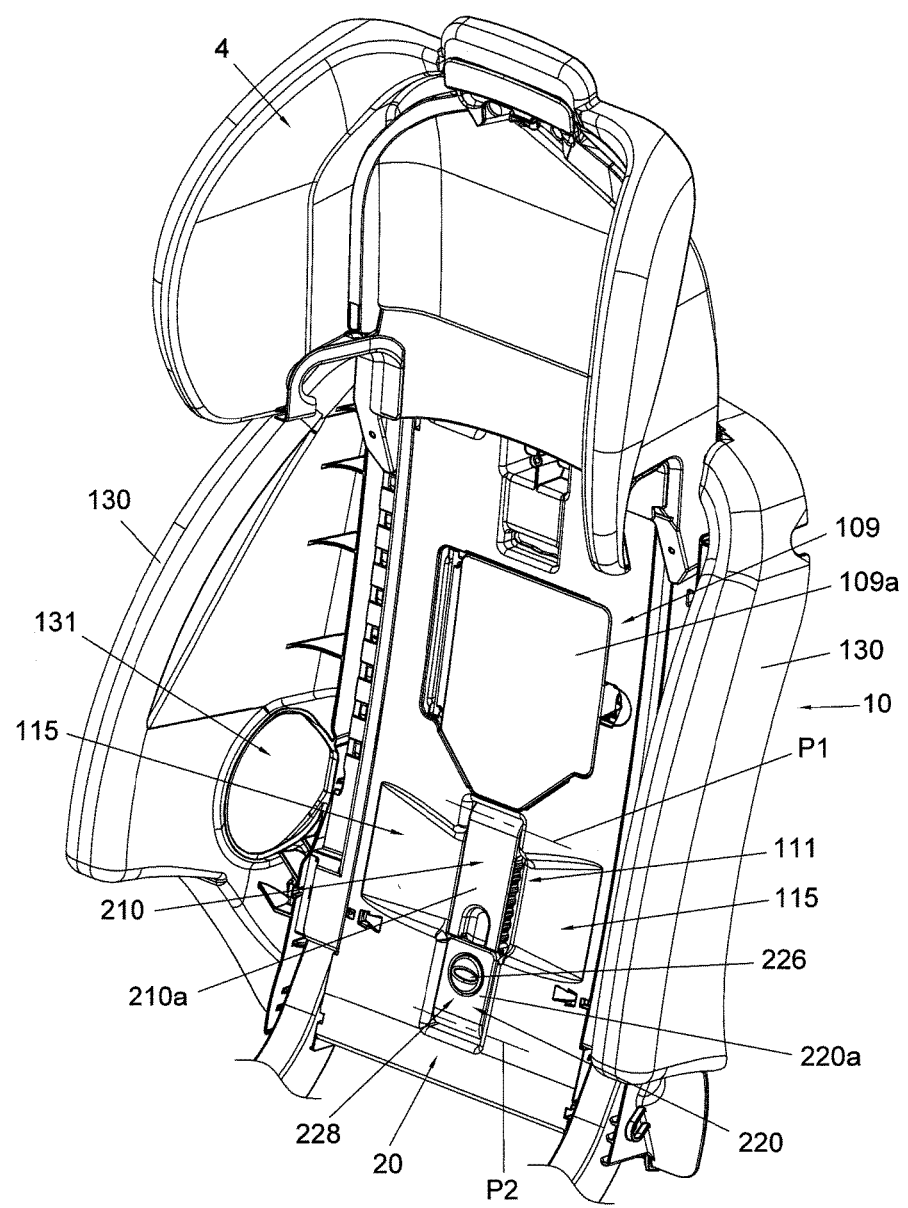
FIG. 11 is a perspective view illustrating the belt tensioning mechanism shown in FIG. 10 in a clamping state.

FIGS. 10 and 11 are schematic views illustrating a variant construction implemented in the belt tensioning mechanism 20 for locking the belt restraint 210 in the clamping state. Like previously described, the belt tensioning mechanism 20 shown in FIGS. 10 and 11 includes the belt restraint 210 and the latch 220 respectively connected pivotally with the backrest 10 about the pivot axes P1 and P2 at the upper and lower side of the recess 111. However, rather than having the notch 214 described previously, the belt restraint 210 shown in FIGS. 10 and 11 can have a knob 226 disposed adjacent to the free end portion 212. The knob 226 can be exemplary provided in a recess 227 that is formed on the outer major surface 210*a* of the belt restraint 210 at the free end portion 212. Moreover, the latch 220 shown in FIGS. 10 and 11 is not spring biased, and can have an opening 228 adapted to engage with the knob 226 of the belt restraint 210. The knob 226 and the opening 228 can have complementary shapes that can mate with each other, e.g., round shapes such as circles or ovals, or polygonal shapes.

FIG. 10 shows the belt restraint 210 in the release state and the latch 220 in the unlocking state disengaged from the belt restraint 210. In the configuration shown in FIG. 10, the knob 226 of the belt restraint 210 is disengaged from the opening 228 of the latch 220, and both the belt restraint 210 and the latch 220 can respectively protrude forward relative to the front surface 110 of the backrest 10. Gravity action applied on the latch 220 may draw the latch 220 downward in contact against a sidewall 113*a* of the backrest 10 (the sidewall 113*a* may exemplary be an inner sidewall of the recess 113 in which the latch 220 is pivotally connected), which can keep the latch 220 in the unlocking state. Like previously described, the belt restraint 210 may be kept in the release state by a spring (such as spring 240 described previously and shown in FIG. 8) respectively connected with the belt restraint 210 and the backrest 10.

FIG. 11 shows the belt restraint 210 in the clamping state and the latch 220 in the locking state. After the belt restraint 210 is positioned in the clamping state, the latch 220 can be rotated about the pivot axis P2 until the knob 226 of the belt restraint 210 engages with the opening 228 of the latch 210, thereby locking the belt restraint 210 in the clamping state. When the latch 210 is engaged with the belt restraint 210, a free end of the latch 210 can be at least partially received in the recess 227 of the outer major surface 210*a* and the knob 226 can be visible through the opening 228, which may help a caregiver to visually determine that the belt restraint 210 is effectively locked in place. The engagement of the knob 226 with the opening 228 can keep the belt restraint 210 in the clamping state, e.g., against a spring biasing action (such as applied by a spring 240 as described previously and shown in FIG. 8) or the reaction force exerted by a tensioned anchoring belt against the belt restraint 210. Like previously described, the outer major surface 210*a* of the belt restraint 210 and the outer major surface 220*a* of the latch 220 can be substantially flush with the front surface 110 of the backrest 10 in the clamping state, and both the belt restraint 210 and the latch 220 do not protrude from the front surface 110 of the backrest 10.

For switching the belt restraint 210 from the clamping state to the release state, a caregiver can manually rotate the latch 220 about the pivot axis P2 so that the latch 220 protrudes forward from the front surface 110 of the backrest 10 and the knob 226 disengages from the opening 228. The belt restraint 210 is thereby unlocked, and can be rotated away from the recess 111 to the release state.

While FIGS. 10 and 11 illustrate a construction in which the knob 226 of the belt restraint 210 engages with the opening 228 of the latch 220, it will be appreciated that the position of the knob 226 and opening 228 may be interchanged, i.e., the latch 220 may have a knob that engages with an opening provided on the outer major surface 210a of the belt restraint 210 for locking the belt restraint in the clamping state.

Advantages of the child safety seats described herein include a belt tensioning mechanism that can securely clamp and tension an anchoring belt for securely fastening the child safety seat on a vehicle seat. The belt tensioning mechanism can be easily operated, and can be advantageously configured on the backrest of the child safety seat so as not to interfere with the adjustment of a headrest.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat portion and a backrest connected with each other, the backrest having a front surface on which is provided a recess;
   a belt restraint connected with the backrest and having a first outer major surface, the belt restraint being movable relative to the backrest between a clamping state for pressing an anchoring belt in the recess and a release state for facilitating installation or removal of the anchoring belt; and
   a latch connected with the backrest and having a second outer major surface, the latch being operable to engage with the belt restraint for locking the belt restraint in the clamping state, and to disengage from the belt restraint for movement of the belt restraint between the clamping state and the release state;
   wherein the first and second outer major surfaces are substantially flush with the front surface of the backrest and the front surface and the first and second outer major surfaces face a same direction when the latch and the belt restraint are engaged with each other.

2. The child safety seat according to claim 1, wherein the latch is movable to protrude forward from the front surface of the backrest for disengaging from the belt restraint.

3. The child safety seat according to claim 1, wherein the belt restraint and the latch are pivotally connected with the backrest.

4. The child safety seat according to claim 3, wherein the latch is pivotally connected with the backrest about a pivot axis that is located below a belt path passing across the recess.

5. The child safety seat according to claim 1, wherein the latch engages with a free end portion of the belt restraint for locking the belt restraint in the clamping state.

6. The child safety seat according to claim 1, wherein the belt restraint has an end surface provided with a notch, and the latch engages with the notch to lock the belt restraint in the clamping state.

7. The child safety seat according to claim 1, wherein the first outer major surface of the belt restraint has a second recess in which is provided a knob, and the latch has an opening, the knob being engaged with the opening for locking the belt restraint in the clamping state.

8. The child safety seat according to claim 1, further comprising a spring connected with the belt restraint, the spring biasing the belt restraint toward the release state.

9. The child safety seat according to claim 1, further comprising a spring connected with the latch, the spring biasing the latch toward a locking state.

10. The child safety seat according to claim 1, wherein the latch has an unlocking state disengaged from the belt restraint, the latch being kept in the unlocking state by gravity action that draws the latch in contact against a sidewall of the backrest.

11. The child safety seat according to claim 1, wherein the front surface of the backrest further includes two depressions respectively provided at a left and a right side of the recess, the two depressions being respectively connected with the recess.

12. A child safety seat comprising:
    a seat portion and a backrest connected with each other, the backrest having a front surface on which is provided a recess, the front surface further including two depressions respectively provided at a left and a right side of the recess, the two depressions being respectively connected with the recess;
    a belt restraint pivotally connected with the backrest at an upper side of the recess, the belt restraint being rotatable relative to the backrest between a clamping state for pressing an anchoring belt in the recess and a release state for facilitating installation or removal of the anchoring belt; and
    a latch pivotally connected with the backrest at a lower side of the recess, the latch being operable to engage with the belt restraint for locking the belt restraint in the clamping state, and to disengage from the belt restraint for unlocking the belt restraint and allowing movement thereof between the clamping state and the release state;
    wherein the belt restraint protrudes from the front surface of the backrest in the release state, and the latch is rotatable to protrude from the front surface of the backrest for disengaging from the belt restraint.

13. The child safety seat according to claim 12, wherein the latch engages with a free end portion of the belt restraint for locking the belt restraint in the clamping state.

14. The child safety seat according to claim 12, wherein the belt restraint has an end surface provided with a notch, and the latch engages with the notch to lock the belt restraint in the clamping state.

15. The child safety seat according to claim 12, wherein the belt restraint has a first outer major surface, and the latch has a second outer major surface, the first and second outer major surfaces being substantially flush with the front surface of the backrest when the latch and the belt restraint are engaged with each other.

16. The child safety seat according to claim 15, wherein the first outer major surface of the belt restraint has a second recess in which is provided a knob, and the latch has an opening, the knob being engaged with the opening for locking the belt restraint in the clamping state.

17. The child safety seat according to claim 12, further comprising a spring connected with the belt restraint, the spring biasing the belt restraint toward the release state.

18. The child safety seat according to claim 12, further comprising a spring connected with the latch, the spring biasing the latch toward a locking state.

19. The child safety seat according to claim 12, wherein the latch has an unlocking state disengaged from the belt restraint, the latch being kept in the unlocking state by gravity action that draws the latch in contact against a sidewall of the backrest.

* * * * *